United States Patent
Kerchner

(10) Patent No.: US 6,811,159 B2
(45) Date of Patent: Nov. 2, 2004

(54) GASKET AND HEAT SHIELD FOR A FLANGED JOINT

(75) Inventor: Douglas M Kerchner, Goodrich, MI (US)

(73) Assignee: General Motors Corporation, Detroit, MI (US)

( * ) Notice: Subject to any disclaimer, the term of this patent is extended or adjusted under 35 U.S.C. 154(b) by 386 days.

(21) Appl. No.: 09/999,797

(22) Filed: Oct. 31, 2001

(65) Prior Publication Data

US 2003/0080519 A1 May 1, 2003

(51) Int. Cl.⁷ ................................................ F16J 15/52
(52) U.S. Cl. ....................... 277/635; 277/597; 277/602; 277/609; 277/616; 277/628
(58) Field of Search ................. 277/597, 602, 277/608, 609, 616, 628, 635

(56) References Cited

U.S. PATENT DOCUMENTS

| | | | | |
|---|---|---|---|---|
| 5,022,431 A | * | 6/1991 | Grey et al. | 137/375 |
| 5,215,315 A | * | 6/1993 | Belter | 277/597 |
| 5,558,344 A | * | 9/1996 | Kestly et al. | 277/608 |
| 6,318,734 B1 | * | 11/2001 | Boskamp | 277/598 |

* cited by examiner

Primary Examiner—Alison K. Pickard
Assistant Examiner—Enoch E Peavey
(74) Attorney, Agent, or Firm—Laura C. Hargitt

(57) ABSTRACT

A gasket and heat shield for sealing and insulating a flanged joint has a first body portion, which contains a gasket member and a second body portion disposed at an angle relative to the first body portion. The first body portion incorporates two openings to accommodate the fasteners, which will be utilized to secure members of a flanged joint together with the first body portion secured therebetween.

9 Claims, 3 Drawing Sheets

GASKET AND HEAT SHIELD FOR A FLANGED JOINT

TECHNICAL FIELD

This invention relates to gaskets and heat shields in high temperature fluid handling systems.

BACKGROUND OF THE INVENTION

In automobile exhaust systems, a series of pipes are interconnected to conduct the flow of hot exhaust gases from the engine to the tailpipe of the automobile. The pipes consist of a manifold pipe and a pipe leading from the exhaust manifold, which are interconnected with flanged members. This portion of the exhaust system transmits the exhaust gas directly from the engine to a pipe or passage leading to the catalytic converter. The flanged connection between these pipes radiates a large amount of thermal energy, which can be detrimental to some of the more sensitive components that are positioned near this joint. These components might include electrical wires and pipes carrying fluid for the engine.

The flanged joint is insulated from the surrounding environment by a heat shield that is attached directly to one or both of the flange members and is separate from the gasket member, which is compressed between these flange members. The gasket member, of course, prevents the direct leakage of exhaust fumes as the exhaust gases pass through the pipes and the shield protects the surrounding environment. The shield requires extensive machining through the flanges so that the shield might be attached thereto. This heat shield also requires additional work by the assembler to place the shield in the proper location, and if not securely fastened can result in a rattle or other disturbing noise within the engine compartment.

SUMMARY OF THE INVENTION

It is an object of the present invention to provide an improved gasket and heat shield for a flanged joint connection in a hot gas transmission system.

In one aspect of the present invention, the gasket and heat shield are formed as a unit, which is attached within the flanged joint by conventional flange joint interconnecting fasteners.

In another aspect of the present invention, the gasket portion of the gasket and heat shield is a compressible member, which is compressed between the flanged joints during assembly.

In yet another aspect of the present invention, the heat shield portion of the gasket and heat shield surrounds or encloses the gasket portion and has a first body portion which is sandwiched between the flanged members and a second body portion which is angularly disposed relative to the first body portion, and is positioned between the flanged joints and the surrounding environment.

The gasket and heat shield of the present invention comprise a unitary structure, which is placed between the connecting flanges during initial assembly of the exhaust system. In prior art applications, the gasket member is positioned between the flanges during assembly and the heat shield was added later. With the present invention, the same fasteners, which connect the flanges to form the joint and compress the gasket also maintains the heat shield in the proper location. Since great care is taken in ensuring that the exhaust system is tight, the heat shield will also be connected in a manner that is rigid and not susceptible to rattles.

The gasket and heat shield of the present invention are assembled to the exhaust system with the same fasteners as are currently used as mentioned above. This saves the cost of additional fasteners to attach the heat shield, the cost of additional machining that must be done to support the fasteners of the prior art heat shields, and also ensures that the heat shield is firmly connected into the exhaust system to eliminate rattles. Thus, it is apparent that the present invention provides many advantages over the prior art applications of a separate gasket and heat shield system.

DESCRIPTION OF EXEMPLARY EMBODIMENTS

Figure 1:
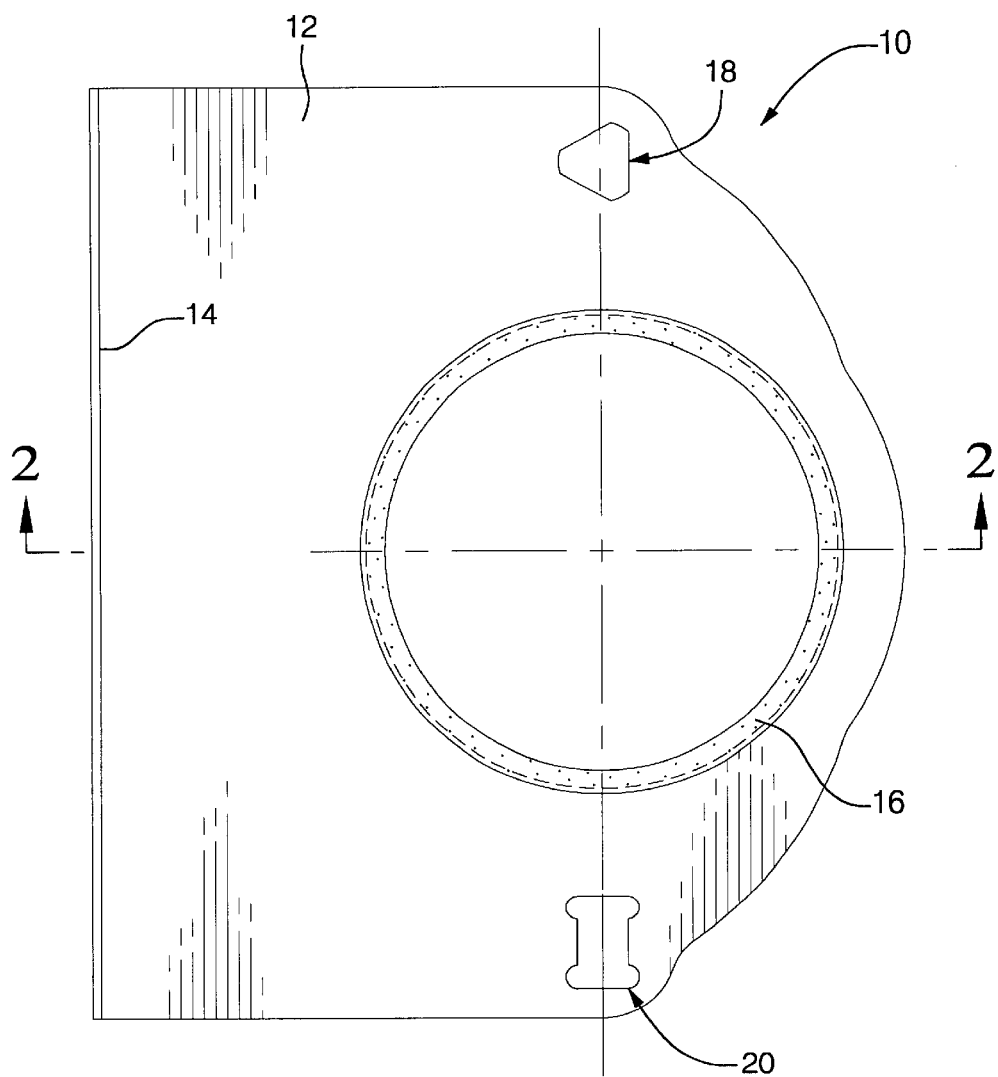
FIG. 1 is a plan view of a gasket and heat shield incorporating the present invention.
Figure 2:
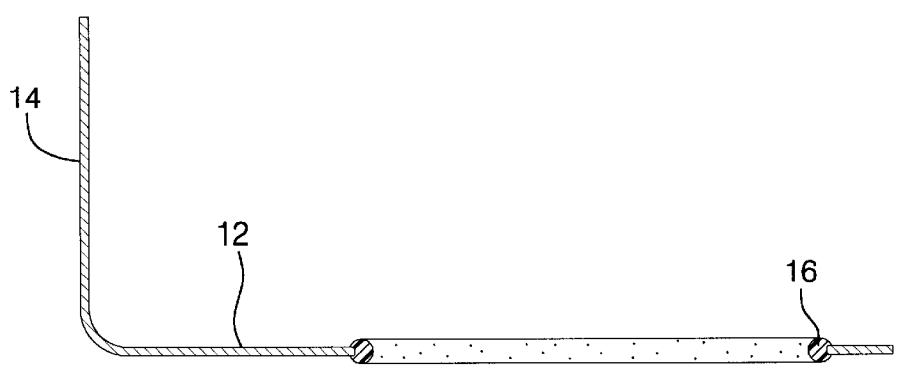
FIG. 2 is a view taken along line 2—2 of FIG. 1.

Referring to the drawings, wherein like characters represent the same or corresponding parts throughout the several views, there is shown in FIGS. 1 and 2 a heat shield and gasket 10 including an upper body portion 12 and a lower body portion 14. The upper body portion 12 incorporates a gasket member 16, which essentially is circular in construction and secured in the upper body portion 12. The gasket member 16 is made of a conventional wire mesh of stainless steel or a Graffoil gasket. These gaskets are well known in the art and are generally utilized in sealing flanged connections to prevent the escape of gas.

Figure 6:
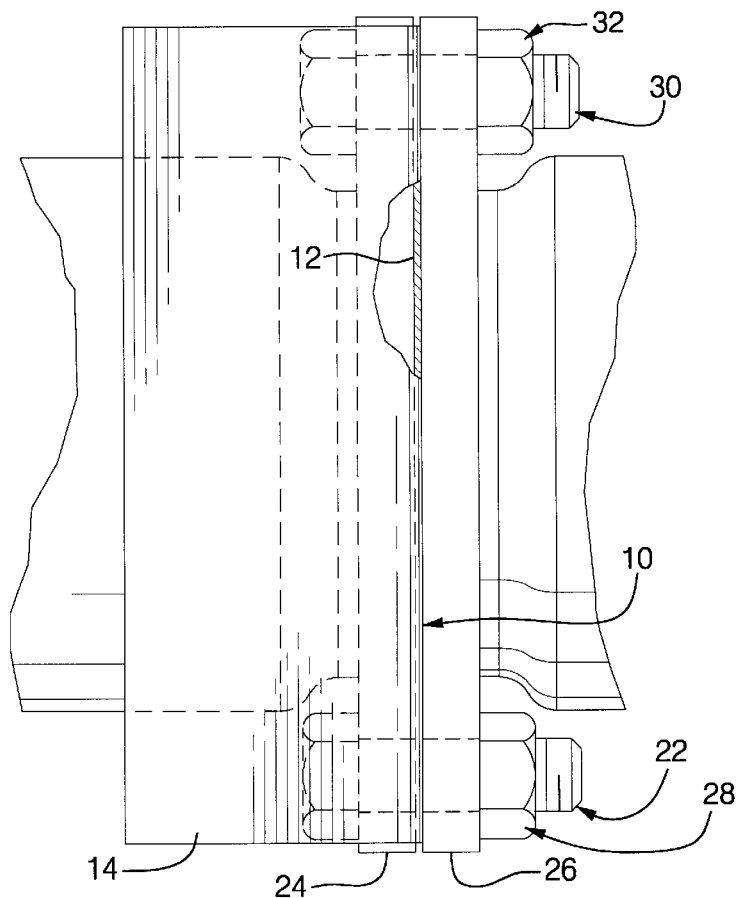
FIG. 6 is a plan view of a portion of a vehicle exhaust system in which the present invention is installed.
Figure 7:
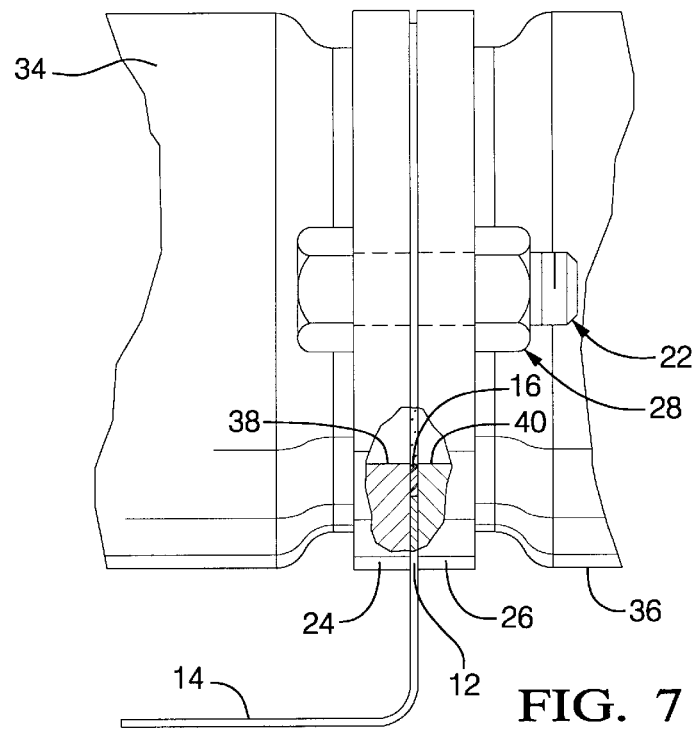
FIG. 7 is a side view of the installation shown in FIG. 6.

The upper body 12 has two apertures or openings 18 and 20 formed therein. The aperture 18 is triangular in shape and is sized to provide contact on three sides with a fastener 22 which secures flanges 24 and 26, as shown in FIGS. 6 and 7. The fastener 22 is secured in location with a second threaded fastener or nut 28. The aperture or opening 20 is dog-boned shape such that a tolerance is provided between the flange connection and the opening 20 to provide some leeway for a fastener 30 during assembly. The fastener 30 is secured in location with a second threaded fastener or nut 32. The flange 24 is secured to a pipe or conduit 34 and the flange 26 is secured to a pipe or conduit 36. These pipe members or conduits 34 and 36 conduct heated exhaust gas from an engine, not shown, to other parts of the exhaust system such as a catalytic converter or tailpipe.

As seen in FIG. 7, the gasket 16 is compressed between the flanges 24 and 26 to prevent the escape of exhaust gas from passage 38 formed in the flange 24 and a passage 40 formed in the flange 26 from escaping to atmosphere as it passes from the pipe 34 to the pipe 36. The lower body portion 14 projects along the length of the conduit 34 as well as past the flange 24 to prevent the radiation of thermo energy from these components to other vehicle systems, not shown.

Figure 3:
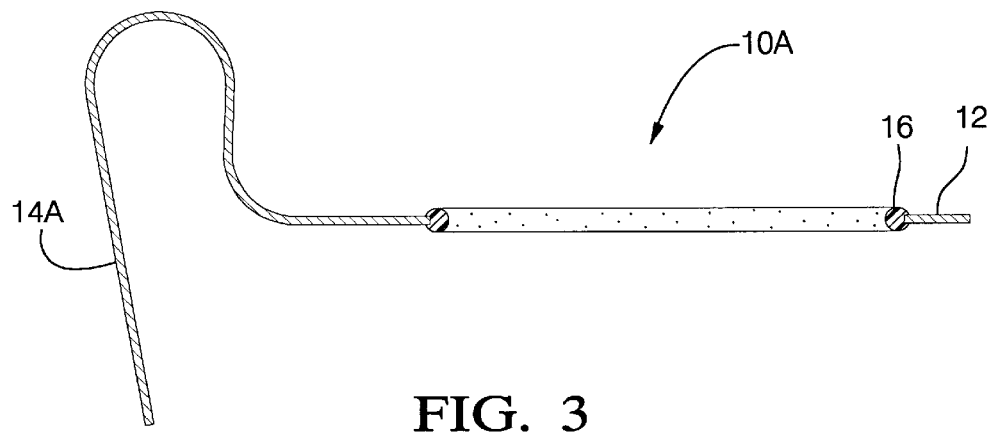
FIG. 3 is a view similar to FIG. 2 describing an alternative embodiment of the present invention.

A gasket and heat shield 10A shown in FIG. 3 has the upper body portion 12 in which is secured the gasket 16, and a lower body portion 14A, which extends at an acute angle relative to the upper body portion 12.

Figure 4:
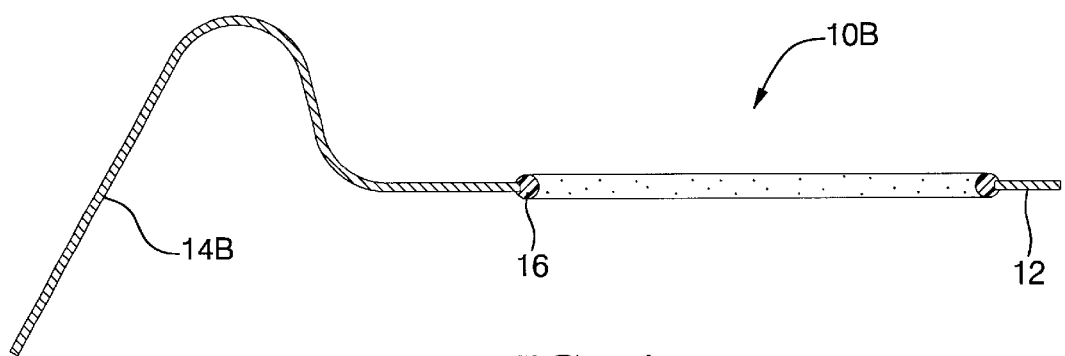
FIG. 4 is a view similar to FIG. 2 describing yet another alternative embodiment of the present invention.

A gasket and heat shield 10B is shown in FIG. 4. This gasket and heat shield 10B incorporates the upper body portion 12, the gasket member 16, and a lower body portion 14B. The lower body portion 14B extends at an obtuse angle relative to the upper body portion 12.

Figure 5:
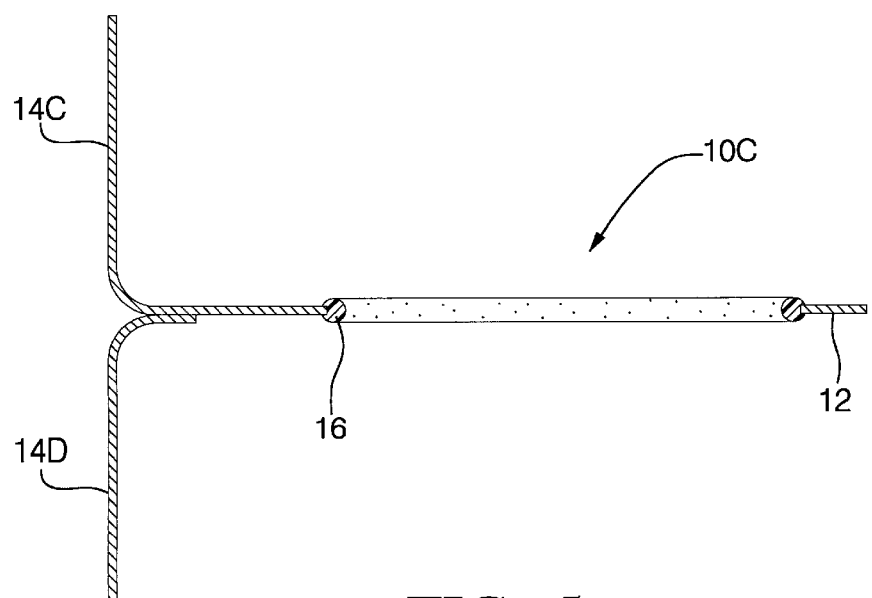
FIG. 5 is a view similar to FIG. 2 describing a third alternative embodiment of the present invention.

A gasket and heat shield 10C shown in FIG. 5 includes the upper body portion 12, the gasket member 16, and two lower body portions 14C and 14D. The body portions 14C and 14D extend in opposite directions from the upper body portion 12 and therefore would extend along the gas pipe in both directions when installed in the flanged connection. Each of the lower body portions 14C and 14D can, of course, have shapes that will provide for different angular dispositions relative to the upper body 12, such as those shown at 14A and 14B.

Obviously, many modifications and variations are possible with the gasket and heat shield incorporating the present invention other than those described in the preferred and alternate embodiments above. Therefore, it is intended that this invention will not be limited by the above description but rather by the appended claims.

What is claimed is:

1. A gasket and heat shield for a flanged joint comprising:
    the flanged joint having first and second flange members and each having a flow passage therein;
    said gasket and heat shield having a first body portion having a passage therethrough, a second body portion, and a compressible gasket secured in said first body portion surrounding that passage, said passage communicating fluid between said flow passages in said first and second flange members;
    said first body portion being secured between said first and second flanges with said compressible gasket being compressed therebetween circumjacent said flow passages and aligning said passage in said first body portion therewith;
    said second body portion extending longitudinally adjacent at least a portion of said flanged joint to provide a heat shield between said flanged joint and the environment adjacent thereto.

2. A gasket and heat shield for a flanged joint comprising:
    the flanged joint having first and second flange members and each having a flow passage therein;
    said gasket and heat shield having a first body portion having a passage therethrough, a second body portion, and a compressible gasket secured in said first body portion surrounding that passage;
    said first body portion being secured between said first and second flanges with said compressible gasket being compressed therebetween circumjacent said flow passages in said first and second flange members and aligning said passage in said first body portion therewith; and
    said second body portion extending angularly from said first body portion adjacent at least a portion of said flanged joint to provide a heat shield between said flanged joint and the environment adjacent thereto.

3. The gasket and heat shield for a flanged joint defined in claim 2 further comprising:
    said second body portion extending angularly at an acute angle relative to said first body portion.

4. The gasket and heat shield for a flanged joint defined in claim 2 further comprising:
    said second body portion extending angularly at an obtuse angle relative to said first body portion.

5. The gasket and hear shield for a flanged joint defined in claim 2 further comprising:
    said second body portion extending perpendicular relative to said first body portion.

6. A gasket and heat shield for a flanged joint comprising:
    the flanged joint having first and second flange members and each having a flow passage therein;
    said gasket and heat shield having a first body portion having a passage therethrough, a second body portion, and a compressible gasket secured in said first body portion surrounding that passage;
    said first body portion being secured between said first and second flanges with said compressible gasket being compressed therebetween circumjacent said flow passage;
    said second body portion having a first member extending angularly from said first body portion and a second member extending angularly from said first body portion in a direction substantially opposite said first member and both of said members being adjacent at least a portion of said flanged joint to provide a heat shield between said flanged joint and the environment adjacent thereto.

7. The gasket and heat shield for a flanged joint defined in claim 6 further comprising;
    said first and second members extending at an acute angle relative to said first body portion.

8. The gasket and heat shield for a flanged connection defined in claim 6 further comprising:
    said first and second members extending at an obtuse angle relative to said first body portion.

9. The gasket and heat shield for a flanged connection defined in claim 6 further comprising:
    one of said first and second members extending at an angle selected from a group consisting of an acute angle, an obtuse angle, and a ninety degree angle, and said other of said first and second members extending at an angle selected from a group consisting of an acute angle, an obtuse angle, and a ninety degree angle.

* * * * *